US006842743B2

United States Patent
Yu et al.

(10) Patent No.: US 6,842,743 B2
(45) Date of Patent: Jan. 11, 2005

(54) TRANSPARENT SECURE ELECTRONIC CREDIT CARD TRANSACTION PROTOCOL WITH CONTENT-BASED AUTHENTICATION

(75) Inventors: Hong Heather Yu, Plainsboro, NJ (US); Xiangyang Kong, Cranbury, NJ (US); Alex Gelman, Smallwood, NY (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 676 days.

(21) Appl. No.: 09/727,847

(22) Filed: Dec. 1, 2000

(65) Prior Publication Data

US 2002/0095388 A1 Jul. 18, 2002

(51) Int. Cl.$^7$ ............................................. G06F 17/60
(52) U.S. Cl. ..................... 705/67; 705/64; 382/100; 382/182; 380/10
(58) Field of Search ............................. 382/100, 182; 705/64–79, 26; 380/10

(56) References Cited

U.S. PATENT DOCUMENTS

| | | | |
|---|---|---|---|
| 3,604,900 A | | 9/1971 | Kalt |
| 5,761,306 A | | 6/1998 | Lewis |
| 5,790,677 A | | 8/1998 | Fox et al. |
| 5,859,920 A | * | 1/1999 | Daly et al. ............... 382/115 |
| 6,266,429 B1 | * | 7/2001 | Lord et al. ............... 382/100 |
| 6,513,118 B1 | * | 1/2003 | Iwamura ................. 713/176 |
| 2002/0010640 A1 | * | 1/2002 | Dutta et al. ............. 705/26 |

FOREIGN PATENT DOCUMENTS

WO    WO 97/29594    * 8/1997    ............ H04N/7/30

OTHER PUBLICATIONS

Lin et al., "A Robust Image Authentication Algorithm Distinguishing JPG Compression from Malicious Manipulations", Jan. 1998.*
Gardner Group, "SET Comparative Performance Analysis," Nov. 2, 1998, pp. 8–9.
SET Secure Electronic Transaction Specification, Book 1: Business Description, Version 1.0, May 31, 1997 by Mastercard and Visa.

* cited by examiner

*Primary Examiner*—James P. Trammell
*Assistant Examiner*—Jalatee Worjloh
(74) *Attorney, Agent, or Firm*—Harness, Dickey & Pierce, PLC

(57) ABSTRACT

A secure credit card transaction method and system operates when a buyer wishes to purchase goods or services using a computer from a web site that is hosted by a server. The credit card transaction method and system embeds a signature in a credit card image on the computer. A first public key is used to embed the signature. The embedded credit card image is authenticated by concatenating bits of the credit card image with transaction information such as payment amount, the buyer's ID, a description of the goods or services, and/or the transaction date. A one-way hash is performed and signed employing a secret key cryptography method. The authenticated and embedded credit card image is then encrypted using the first public key and transmitted to the server that hosts the web site offering the goods and services for sale.

20 Claims, 5 Drawing Sheets

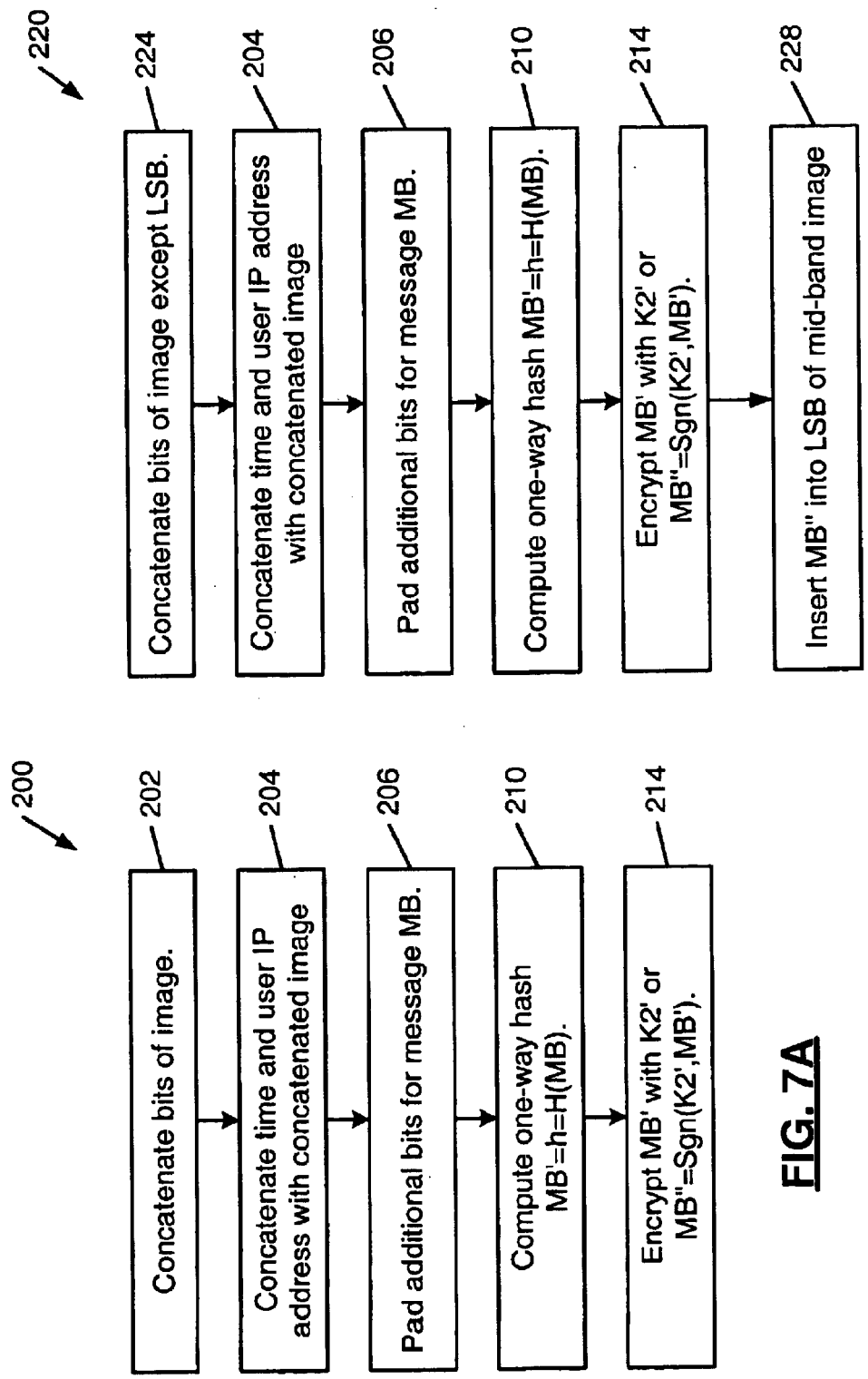

TRANSPARENT SECURE ELECTRONIC CREDIT CARD TRANSACTION PROTOCOL WITH CONTENT-BASED AUTHENTICATION

FIELD OF THE INVENTION

This invention relates to credit transactions and, more particularly to transaction protocols for secure credit card transactions that are executed over a distributed communications system via computers.

BACKGROUND OF THE INVENTION

Advances in multimedia, communication and networking technologies have dramatically increased the use of electronic commerce. In particular, businesses have developed web sites that provide an electronic storefront to encourage customers to view their merchandise from remote locations and to purchase their merchandise. Consumers use various types of devices to access the Internet such as computers, personal digital assistants, web-enabled cellular phones or other Internet-enabled devices.

Advantages of electronic storefronts include reduced overhead costs due to the lack of investment in brick and mortar. Electronic commerce also provides businesses with significant gains in efficiency through better management of inventory. In other words, the volume and number of transaction increases, which makes inventory management easier than brick and mortar facilities having lower volume. In addition, customers can access the electronic storefront from any location in the world that provides access to the Internet. Electronic commerce also has the capability of reaching a wider audience than individual brick and mortar storefronts with relatively low initial capital costs.

One obstacle that may slow the growth of electronic commerce is the inadequacy of security that is currently provided by the Internet. Many businesses have delayed moving towards the electronic commerce business model due to their concerns relating to network security, application security, and system security. Consumers have also been wary of transmitting their credit card information or other forms of payment over the Internet. The security concerns of businesses and consumers have slowed the growth of electronic commerce.

Credit card transactions involve several different parties: the buyer or credit card holder, the seller or merchant, the merchant's bank, the credit card issuing bank, and the credit card network. The merchant submits the credit card transactions to the credit card network. The credit card network processes the merchant's credit card transactions through the financial network on behalf of the merchant bank.

Security risks to electronic credit card systems arise in the consumer or merchant domains and in the financial institution domain. In addition, there are also network security risks. Attacks on the security of electronic credit card transaction systems will be attempted for financial gain. Specific attacks include attempts to duplicate or steal genuine purchase orders or credit card information, creating fraudulent purchase orders or credit card information, and/or altering data that is stored in records or sent in messages that are transmitted between devices. For example, the amount of money the buyer should pay can be altered. The recipient of the electronic payment (the merchant) may also be fraudulently modified. Traditional electronic credit card transactions systems mainly focus on protecting the customer and the banks from bad merchants or third party thefts. These transaction systems do not protect merchants from bad customers.

Therefore, to reduce the security risks, an electronic commerce transaction system must provide adequate security to all of the parties involved in the electronic commerce transactions.

SUMMARY OF THE INVENTION

A secure credit card transaction method and system according to the present invention operates when a buyer wishes to purchase goods or services using a computer from a web site that is hosted by a server. The credit card transaction method and system embeds a signature in a credit card image on the computer. A first public key received from a certificate authority is used to embed the signature. The embedded credit card image is authenticated by adding transaction information such as the payment amount, the buyer's Internet protocol (IP) address, a description of the goods or services, and/or the transaction date. The authenticated and embedded credit card image is then encrypted and transmitted to the server that hosts the web site offering the goods and services for sale. A second public key received from the certificate authority is used for authentication. The authenticated and embedded credit card image is then encrypted with the first key.

In other features of the invention, the step of imbedding the signature in the credit card image includes the step of mapping a first public key into a first seed. A first random sequence is generated from the first seed. The credit card image is in Joint Photographic Experts Group (JPEG) format with Discrete Cosine Transform (DCT) coefficients. Blocks of the JPEG image are identified using the first random sequence. The first public key is then mapped into a second seed. A second random sequence is generated from the second seed. DCT coefficients are identified using the second random sequence. Bits are embedded into the selected DCT coefficients of the selected blocks. Preferably, the DCT coefficients that are selected are in the mid- and/or high band region of the DCT coefficients.

In still other features of the invention, the step of authenticating the embedded credit card image includes the steps of generating a first concatenated credit card image by concatenating bits of the DCT coefficients of the embedded credit card image. A second concatenated credit card image is generated by concatenating at least one transaction data field onto the first concatenated credit card image. Additional bits are padded onto the second concatenated credit card image to reach a predetermined bit length. A one-way hash is computed on the second concatenated credit card image and signed with a second key received from the certificate authority.

In still other features of the invention, the second concatenated credit card image is encrypted using the first key. The encrypted, authenticated and embedded credit card image is transmitted to the server.

Still other objects, features and advantages will be apparent from the specification, the drawings and claims that follow.

BRIEF DESCRIPTION OF THE DRAWINGS

FIG. 6 illustrates a credit card image in JPEG format that includes DCT coefficients for 8×8 blocks of the credit card image;

FIG. 7A illustrates steps of the method for authenticating the electronic credit card transaction; and FIG. 7B illustrates steps of an alternative method for authenticating the electronic credit card transaction.

DETAILED DESCRIPTION OF THE PREFERRED EMBODIMENTS

The ensuing detailed description provides preferred exemplary embodiments only and is not intended to limit the scope, applicability or configuration of the present invention. Rather, the ensuing detailed description of the preferred exemplary embodiments will provide those skilled in the art with an enabling description for implementing the preferred exemplary embodiments of the present invention. It being understood that various changes may be made in the function and arrangement of the elements without departing from the spirit and scope of the invention as set forth in the appended claims.

Figure 1:
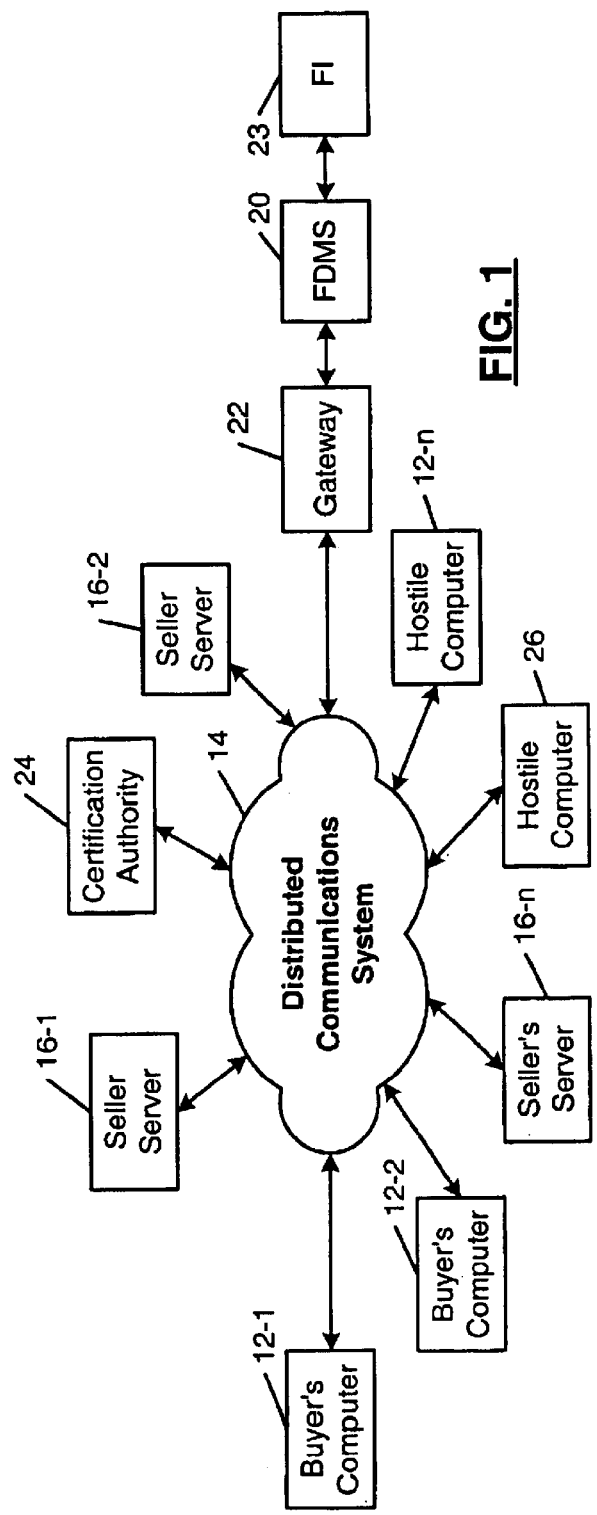
FIG. 1 is a functional block diagram that illustrates a transparent credit card transaction protocol (TCCTP) system according to the invention.

Referring now to FIG. 1, a transparent credit card transaction protocol system 10 is illustrated and includes computers 12-1, 12-2, . . . , 12-n that are associated with buyers. The computers 12 can be personal computers (such as notebooks or desktops), personal digital assistants, cellular phones, or other devices containing a processor and memory. The computers 12 are connected to a distributed communications system 14 using phone lines, cable (coaxial or optical), radio frequency (RF), satellite or any other suitable method. The distributed communications system 14 can be a public network such as the Internet, a private network, an extranet and/or a private network that is connected to a public network through a gateway (such as a set top box system). One or more servers 16-1, 16-2, . . . , 16-n host seller websites. A First Data Merchant Service (FDMS) 20 is connected by a gateway 22 to the distributed communications system 14. A Financial Institution (FI) 23, such as the merchant bank, is connected to the FDMS. A certification authority 24 is connected to the distributed communications system 14. The certification authority 24 supplies certificates that offer a high assurance of identity of the seller and the buyer. The certificates typically contain a message with the name and one or more public keys.

One or more hostile computers 26 are also connected to the distributed communications system 14. In use, the buyer uses the computer 12 to connect to an electronic storefront that is provided by one or more web pages that are delivered by the server 16 that hosts the seller's website. If the buyer decides to purchase merchandise or services from the seller using an electronic credit card, the buyer must transmit transaction information to the seller's website. The transaction information includes information concerning the buyer's ID, the items purchased, the credit card number, the credit card expiration, and other transaction information. The transaction information is transmitted over the distributed communications system 14. The seller must confirm the transaction information using the certificate authority 24 and the FDMS 20. Processing of payment transactions on electronic networks are described in detail in U.S. Pat. Nos. 3,604,900 and 5,790,677 and in "Secure Electronic Transaction Specification" that is available at www.setco.org/download.html. These documents are hereby incorporated by reference.

The hostile computer 26 monitors the network for credit card transactions and obtains access to the transaction information that is stored in the buyer's computer that is sent by the buyer's computer 12 to the seller's server 16, and/or that is sent by the seller's server 16 to the certification authority 24 or to the FDMS 20. The hostile computer 26 steals the buyer credit card information or intercepts the transaction information and uses it to the disadvantage of the buyer, the seller, and/or the credit card company. In addition, the hostile computer 26 often creates fraudulent transaction information in an attempt to defraud the buyer, the seller, and/or the credit card company.

Figure 2:
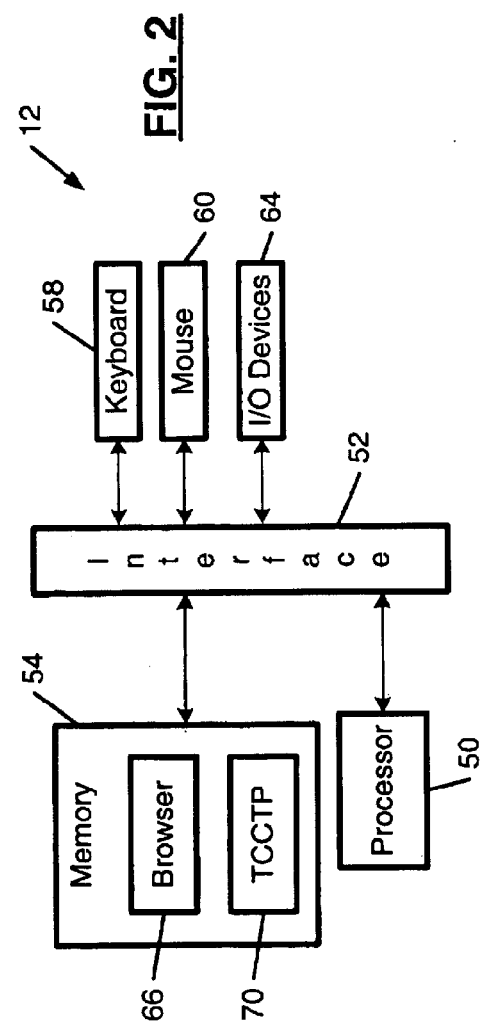
FIG. 2 is a functional block diagram of a buyer's computer.

Referring now to FIG. 2, the buyer's computer 12 typically includes a processor 50 that is connected to an input/output (I/O) interface 52. Memory 54 includes read only memory (ROM), random access memory (RAM), external storage such as floppy disks, hard drives, optical drives, etc., and/or flash memory. A keyboard 58, a mouse 60, and I/O devices 64 (such as a printer, scanner, display, speakers and other devices) are typically connected to the I/O interface 52. The memory 54 includes a browser 66 that is loaded when the user accesses the distributed communications system 14. A transparent credit card transaction protocol (TCCTP) module 70 according to the present invention is stored in the memory 54 of the computer 12 and provides a secure environment for entering electronic commerce transactions over the distributed communications system 14. The TCCTP module 70 can be integrated with the browser 66, a stand-alone program or can be downloaded to the computer 12 from the Internet when needed.

Figure 3:
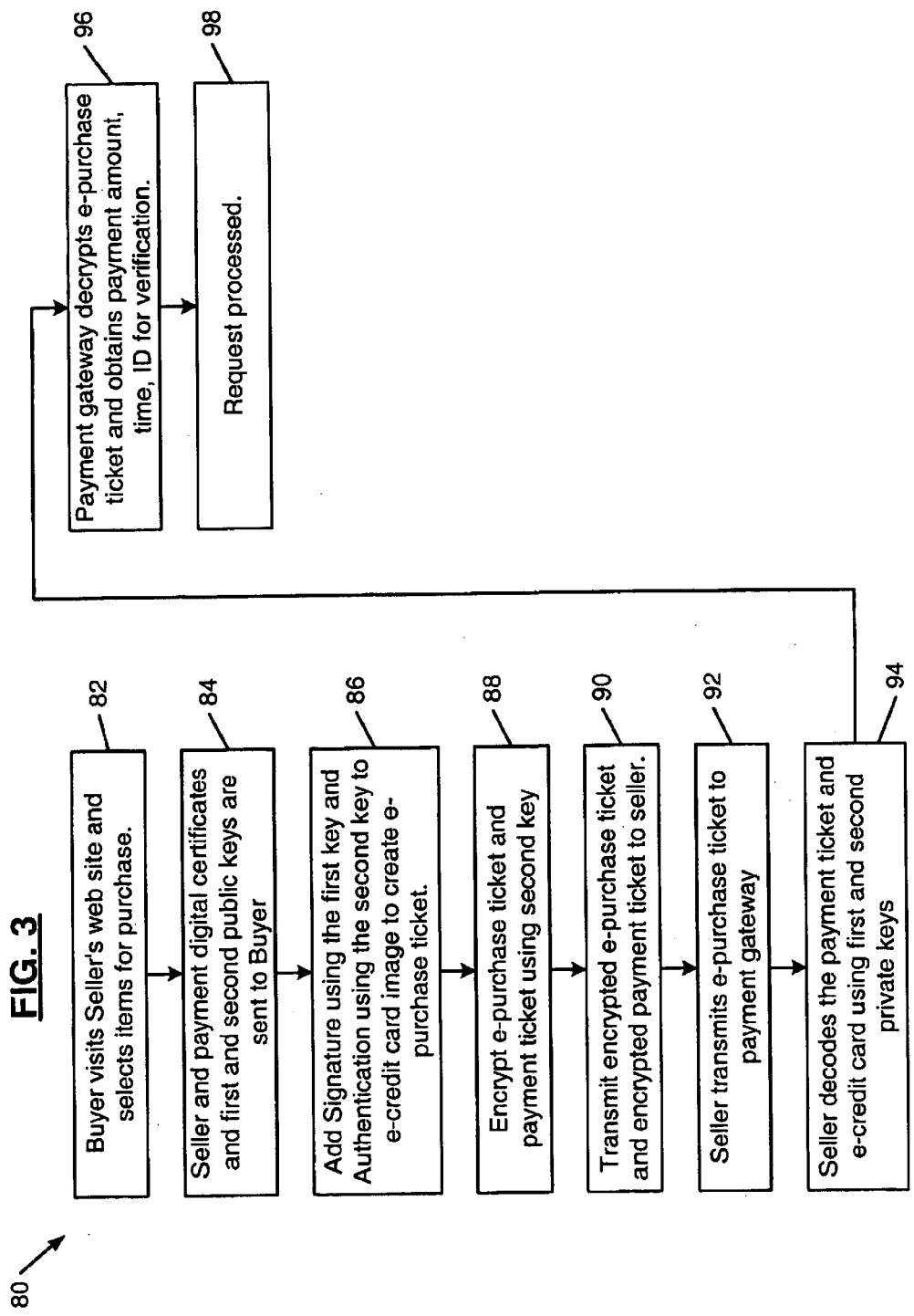
FIG. 3 illustrates steps performed by the TCCTP system according to present invention.

Referring now to FIG. 3, the steps that are performed by the TCCTP module 70 are illustrated and are generally designated 80. Preferably the electronic credit card image is in Joint Photographic Experts Group (JPEG) format. In step 82, the buyer visits the web site of the seller and selects product and/or services for purchase. In step 84, the certification authority 24 sends seller digital certificates and payment digital certificates and first and second public keys to the buyer's computer 12. In step 86, a signature is added to the buyer's electronic credit card image using the first key. Authentication is added to the electronic credit card image using the second key to create an electronic purchase ticket. In step 88, the electronic purchase ticket and payment ticket are encrypted using the first key. In step 90, the electronic purchase ticket and the encrypted payment ticket are transmitted to the seller. In step 92, the merchant transmits the encrypted electronic purchase ticket to the FDMS 20 through the payment gateway 22. In step 94, the seller decodes the payment ticket to verify the payment contract and decodes the electronic purchase ticket to obtain the electronic credit card using a first private key. In step 96, the FI 23 decrypts the electronic purchase ticket and obtains the payment amount, the time, and the identification of the buyer for verification. In step 98, the request is processed.

Figure 4:
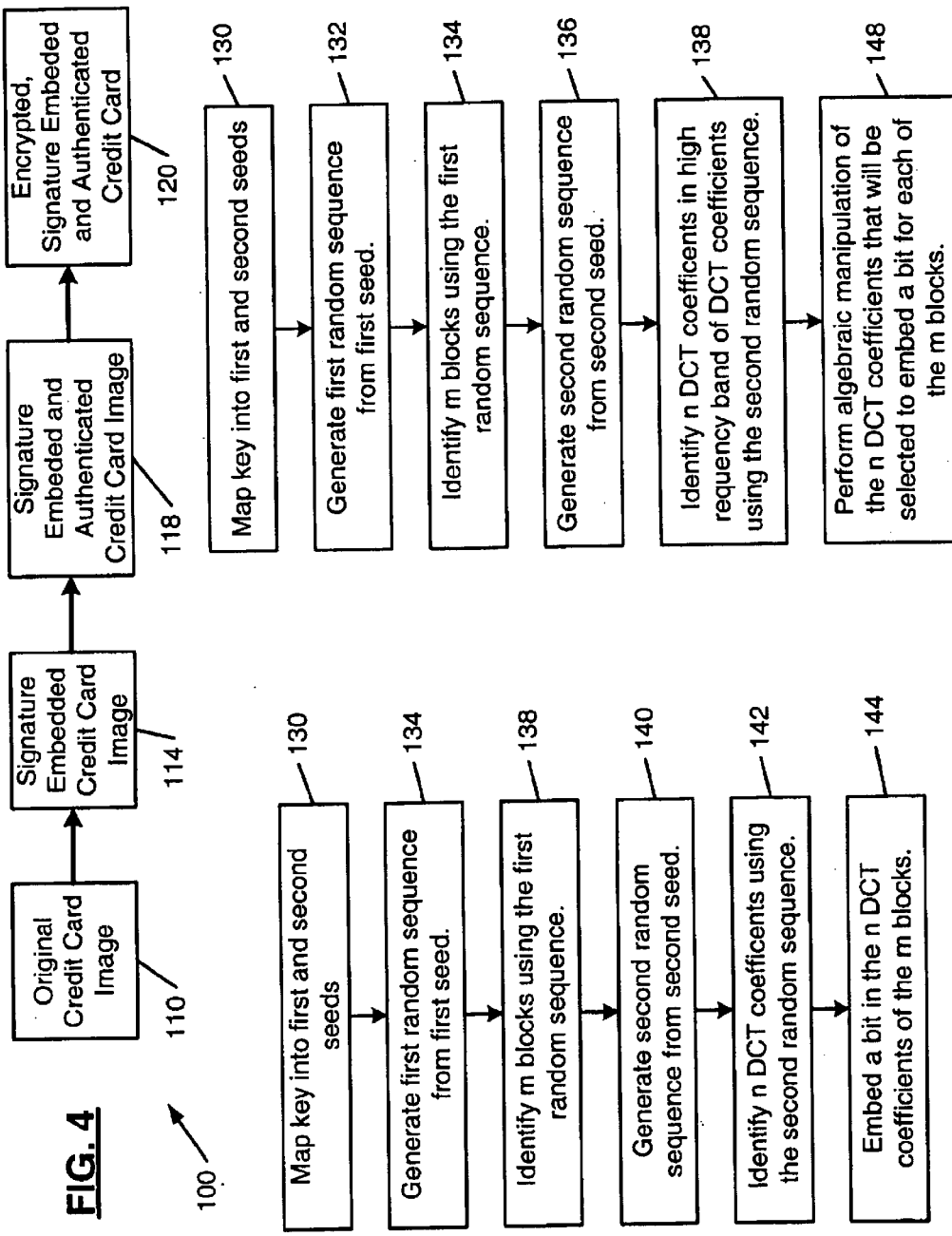
FIG. 4 illustrates steps for signature embedding, encrypting and authenticating an electronic credit card image.

Referring now to FIG. 4, steps for transforming the electronic credit card image into a signature embedded, authenticated and encrypted electronic credit card image are shown and are generally designated 110. Initially, the TCCTP module 70 performs a signature embedding method on credit card image 110 to create a signature embedded credit card image 114. Preferably the credit card image is in JPEG format with DCT coefficients. The TCCTP module 70 performs an authentication method on the signature embedded credit card image 114 to create a signature embedded and authenticated credit card image 118. The TCCTP module 70 performs an encryption method on the signature embedded and authenticated credit card image to create a signature embedded, authenticated and encrypted credit card image 120. The signature embedded, authenticated and encrypted credit card image 120 is transmitted by the buyer's computer 12 over the distributed communications system.

Figure 5:
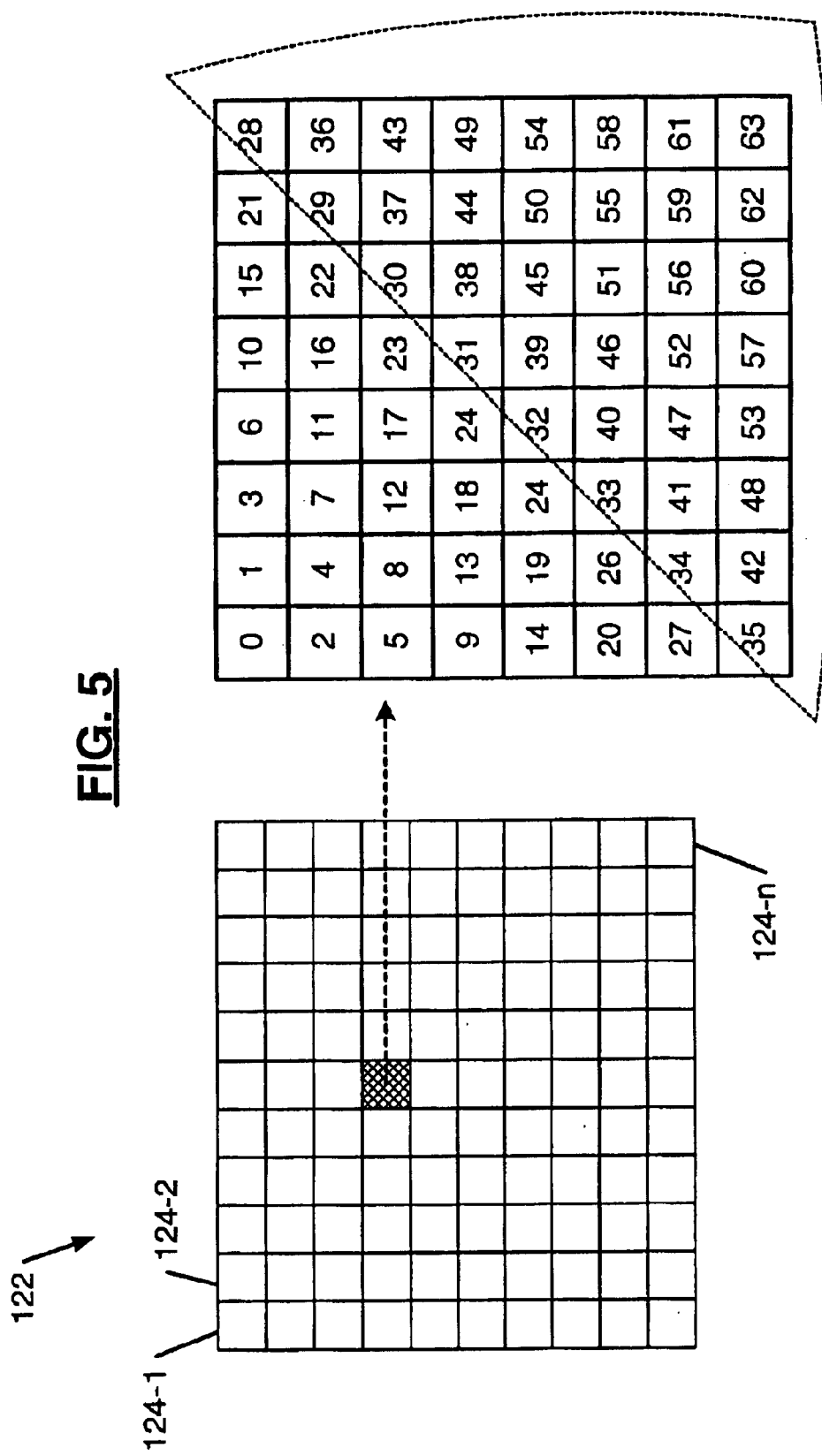
FIG. 5A the illustrates steps of the signature embedding method.
FIG. 5B illustrates an alternative signature embedding method.

Referring now to FIG. 5, the electronic credit card image 122 includes X by Y pixels. Preferably the electronic credit card image 122 is compressed using JPEG compression. JPEG compression divides the electronic credit card image 122 into blocks 124-1, 124-2, . . . , 124-n. Each block 124 is an 8×8 matrix of DCT coefficients. The 8×8 matrix of coefficients contains low band coefficients 126, mid band coefficients 127, and high band coefficients 128. The human eye generally responds more to the alteration on the low band coefficients 126 than to the mid band coefficients 127 or the high band coefficients 128.

Referring now to FIG. 6A, the signature embedding method that is performed by the TCCTP module 70 is shown. In step 130, the first public key (from the certification authority) is mapped into first and second seeds by the TCCTP module 70. In step 134, a first random sequence is generated from the first seed by the TCCTP module 70. In step 138, m blocks of the JPEG electronic credit card image are identified using the first random sequence by the TCCTP module 70. In step 140, a second random sequence is generated from the second seed by the TCCTP module 70. In step 142, n DCT coefficients from the m blocks are identified using the second random sequence by the TCCTP module 70. In step 144, signature bits are embedded in the n DCT coefficients of the m blocks by the TCCTP module 70. Preferably the n DCT coefficients are selected from the high band DCT coefficient as will be described further below such that they are not visible.

Referring now to FIG. 6B, alternate steps for adding the signature to the credit card image 110 are shown. Reference numbers from FIG. 6A will be used where appropriate to denote similar steps. In step 130, the first public key (from the certification authority) is mapped into first and second seeds by the TCCTP module 70. In step 134, the first random sequence is generated from the first seed by the TCCTP module 70. In step 138, m blocks of the JPEG electronic credit card image are identified using the first random sequence by the TCCTP module 70. In step 140, the second random sequence is generated from the second seed by the TCCTP module 70. In step 142, n DCT coefficients of the m blocks are identified using the second random sequence by the TCCTP module 70. In step 148, algebraic manipulation of the selected n DCT coefficients of the m blocks is performed. For example, assume that the blocks 8, 24 and 32 are selected and the DCT coefficients 41 and 44 are selected. One algebraic manipulation would be to use the DCT coefficients 41 and 44 of the block 8, the DCT coefficients 42 and 45 of the block 24 and the DCT coefficients 43 and 46 of the block 32. Skilled artisans can appreciate that there are other suitable algebraic manipulations.

An exemplary signature embedding method that provides robust data hiding is described below. The exemplary signature embedding method is used to embed a user signature S into the host credit card image A. Assume that the size of A is X×Y, that the zth coefficient of the jth 8×8 block is $F_j(z)$, and that there are altogether J blocks. The signature $S=s_1, s_2, s_3 \ldots s_M$, where M<37, is embedded in the high band coefficients 128 using statistical mean manipulation, i.e., z>27, e.g., z=28, 29, 30 . . . 63.

First, a first key K1 is mapped into two seeds that are used to generate a random sequence $R=r_1, r_2, r_3 \ldots$ with $r_n<J$ and a random sequence of $R'=r'_1, r'_2, r'_3 \ldots$ with $r'_n<37$ and for $\forall\ n1 \ne n2$, $r'_{n1} \ne r'_{n2}$. To embed a '1' bit, i.e., $s_m=1$, for n=1 to N, if $F_{r_{(N*m+n)}}(r'_m) < F_{r_{(N*m+n+1)}}(r'_m)$, increase $F_{r_{(N*m+n)}}(r'_m)$ and decrease $F_{r_{(N*m+n+1)}}(r'_m)$, such that $F_{r_{(N*m+n)}}(r'_m) > F_{r_{(N*m+n+1)}}(r'_m)$. To embed a '0' bit, i.e., $s_m=0$, for n=1 to N, if $F_{r_{(N*m+n)}}(r'_m) > F_{r_{(N*m+n+1)}}(r'_m)$, decrease $F_{r_{(N*m+n)}}(r'_m)$ and increase $F_{r_{(N*m+n+1)}}(r'_m)$, such that $F_{r_{(N*m+n)}}(r'_m) < F_{r_{(N*m+n+1)}}(r'_m)$. Decoding is similarly done with the mean of the statistics determining the embedding bit, that is, $$\text{if } \left(\sum_n F_{r_{(N*m+n)}}(r'_m)\right)/N > \left(\sum_n F_{r_{(N*m+n+1)}}(r'_m)\right)/N,$$

$$s_m = 1, \text{ else, } s_m = 0.$$

Referring now to FIG. 7A, steps for authenticating the credit card image are illustrated at 200. In step 202, the bits of the electronic image signal are concatenated. In step 204, the concatenated bits of the electronic credit card image are joined with transaction information such as the time, payment amount, user ID, transaction ID, and the user Internet Protocol (IP) address to authenticate the electronic credit card image. In step 206, the bits forming the authenticated credit card image are padded with zeros until a predetermined length, such as 512 bits, is achieved. In step 210, a one-way hash is computed on the padded data stream and signed with a second key. In step 214, the padded and authenticated credit card image is encrypted with the first key.

Referring now to FIG. 7B, alternate authentication steps for authenticating the credit card image are illustrated at 200. Reference numbers from FIG. 7A will be used where appropriate to denote like elements. In step 224, bits of the electronic image signal are concatenated except for the least significant bit (LSB). In step 204, bits of the electronic credit card image are joined with transaction information such as the time, payment amount, user ID, transaction ID, and the user IP address to create a message MB. In step 206, the message MB is padded with zeros until a predetermined length is achieved. In step 210, a one-way hash is computed and signed with a second key, which is embedded to the signature embedded credit card image and generates an authenticated credit card image. In step 214, the authenticated credit card image is encrypted with a first key.

For example, the electronic credit card image is an 8 bit, single channel image, in other words a gray scale image. Concatenating all the high bits (all the bits except the least significant bit (LSB)) of all the coefficients of A yields a message of (X×Y×7) bits in length. By concatenating the time (06/30/99 21:45:10), the payment amount ($200.95) and user IP address (255.255.255), a message MB of length L=(X×Y×7+28×8) bits is produced. If L % 512≠0, pad as many 0s to MB as needed until the length of MB satisfies L % 512=0. Compute a one-way hash, MB'=h=H(MB) using MD5. Use the secret key cryptography method and signing MB' with the second private key K2', MB"=Sgn(K2', MB').

Insert the 128 bits message MB" into the LSB of each DCT coefficient in the mid-band (see FIG. 7) from 1→0 if embedding 0 or 0→1 if embedding 1. Note that to ensure invisibility, a just noticeable difference (JND) function can be used to guide where these 128 bits should be hidden. In addition, each of the 128 bits can be embedded multiple times if the capacity is larger than 128 bits to increase the robustness. Authentication of multi-channel images (i.e., color images) can be similarly done. If preferable, MB" can be inserted into the comment area of the JPEG image instead of the LSBs of DCT coefficients to reduce the increase of bit rate. The authenticated credit card image is encrypted before transmission. Encryption is done with a public-key cryptography algorithm, such as Rivest, Shamir, and Adleman (RSA). The key pair, K2 & K2', are the encryption and decryption keys respectively. The key K2' is known by the FI 23.

Those skilled in the art can now appreciate from the foregoing description that the broad teachings of the present invention can be implemented in a variety of forms. Therefore, while this invention has been described in connection with particular examples, thereof, the true scope of the invention should not be so limited since other modifications will become apparent to the skilled practitioner upon a study of the drawings, the specification and the following claims.

What is claimed is:

1. A method for securing credit card transactions over a distributed communications system when a buyer wishes to purchase one of said goods and services using a computer from a web site hosted by a server, comprising the steps of:

generating an embedded credit card image by embedding a signature in a credit card image on said computer;

generating an authenticated and embedded credit card image by authenticating said embedded credit card image; and generating an encrypted, authenticated and embedded credit card image by encrypting said authenticated and embedded credit card image, wherein said encrypted, authenticated and embedded credit card image is transmitted to said server, and wherein said credit card image is in JPEG format with blocks of DCT coefficients, wherein said step of generating said embedded credit card image includes the steps of:

mapping a first public key into a first seed;

generating a first random sequence from said first seed; and identifying m blocks of said JPEG image using said first random sequence.

2. The method of claim 1 further comprising the step of: receiving said first public key from a certificate authority.

3. The method of claim 1 further comprising the steps of: mapping said first public key into a second seed;

generating a second random sequence from said second seed; and identifying n of said DCT coefficients of said JPEG image using said second random sequence.

4. The method of claim 3 further comprising the step of: embedding a bit in said n DCT coefficients of said m blocks.

5. The method of claim 4 wherein said n DCT coefficients are selected from high band DCT coefficients of said m blocks.

6. The method of claim 4 further comprising the step of: performing algebraic manipulation of said n DCT coefficients that are selected.

7. The method of claim 6 wherein said step of generating said authenticated and embedded credit card image includes the steps of:

generating a first concatenated credit card image by concatenating bits of said DCT coefficients of said embedded credit card image; and generating a second concatenated credit card image by concatenating at least one transaction data field onto said first concatenated credit card image.

8. The method of claim 7 further comprising the step of: padding additional bits onto said second concatenated credit card image to reach a predetermined bit length.

9. The method of claim 8 further comprising the step of: computing a one-way hash on said second concatenated credit card image.

10. The method of claim 9 further comprising the step of: signing said hashed second concatenated credit card image using a secret key cryptography method employing a second private key.

11. A method for securing credit card transactions over a distributed communications system between a server and a computer, comprising the steps of:

generating an embedded credit card image by embedding a signature in a credit card image on said computer, wherein said credit card image is in JPEG format with blocks of DCT coefficients, and wherein said step of embedding said credit card image includes the steps of mapping a first public key from a certificate authority into a first seed, generating a first random sequence from said first seed, and identifying m blocks of said JPEG image using said first random sequence.

12. The method of claim 11 wherein said step of generating said embedded credit card image further comprises the steps of:

mapping said first public key into a second seed;

generating a second random sequence from said second seed; and identifying n of said DCT coefficients of said JPEG image using said second random sequence.

13. The method of claim 12 wherein said step of generating said embedded credit card image further comprises the steps of:

embedding a bit in said n DCT coefficients of said m blocks.

14. The method of claim 13 wherein said n DCT coefficients are selected from high band DCT coefficients of said m blocks.

15. The method of claim 14 wherein said step of generating said embedded credit card image further comprises the steps of:

performing algebraic manipulation of said n DCT coefficients that are selected.

16. The method of claim 15 further comprising the steps of:

generating an authenticated and embedded credit card image by authenticating said embedded credit card image; and generating an encrypted, authenticated and embedded credit card image by encrypting said authenticated and embedded credit card image, wherein said encrypted, authenticated and embedded credit card image is transmitted to said server.

17. A method of authenticating credit card transactions over a distributed communications system between a server and a computer, comprising the steps of:

providing a credit card image in JPEG format with DCT coefficients;

generating a first concatenated credit card image by concatenating bits of said DCT coefficients of said credit card image; and generating a second concatenated credit card image by concatenating at least one transaction data field with said first concatenated credit card image.

18. The method of claim 17 further comprising the step of: padding additional bits onto said first concatenated credit card image to reach a predetermined bit length.

19. The method of claim 18 further comprising the step of: computing a one-way hash on said padded second concatenated credit card image.

20. The method of claim 19 further comprising the step of: signing said hashed, padded second concatenated credit card image using a secret key cryptography method.

* * * * *